Patented Oct. 12, 1926.

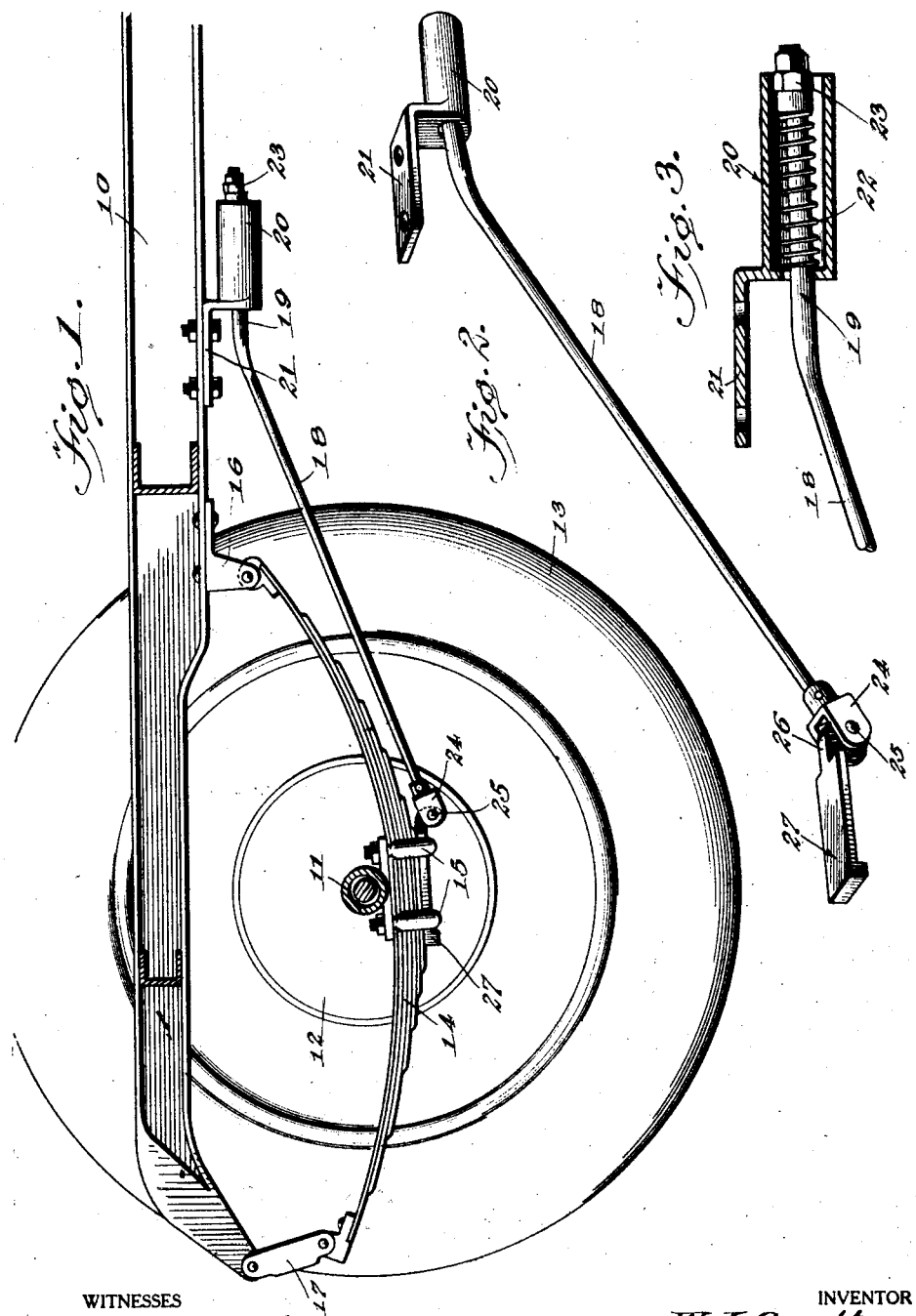

1,602,466

UNITED STATES PATENT OFFICE.

WILLIAM J. SWETT, OF LIVINGSTON, MONTANA, ASSIGNOR OF ONE-HALF TO FREDERICK A. KRIEGER, OF LIVINGSTON, MONTANA.

SAFETY REAR-AXLE BRACE.

Application filed February 4, 1925. Serial No. 6,856.

My present invention relates generally to that type of motor driven vehicle in which the rear wheels are driven through connections of such nature that disastrous consequences often follow the breaking of a rear spring due to the fact that the rear axle is thereby permitted to shift out of its normal alinement. In such instances the driving connections at the rear axle become locked, and proper setting of the brakes becomes difficult even where possible.

My object is the provision of braces between the frame and the rear axle, connected either directly or indirectly to the latter, and of such nature and so placed that the rear axle will be braced in its normal alined position irrespective of the breaking of a rear spring and the normal dangerous condition relieved and safety assured.

In the accompanying drawing which illustrates my invention:—

Figure 1 is a vertical section through the rear portion of the chassis of an automobile or motor car equipped with my invention;

Figure 2 is a detail perspective view showing the brace of Fig. 1 removed, and,

Figure 3 is a detail longitudinal section through the upper front supporting bracket of the brace.

Referring now to these figures, I have shown in Fig. 1 portions of the chassis of an automobile or motor car including one of the frame side bars 10, rear axle 11, brake drum 12, and wheel 13, together with the rear spring 14, connected to the axle 11 by spring clamps 15. The spring 14 is shown connected in the usual manner to the frame bar 10, the connections including front and rear shackles 16 and 17.

My invention consists in the provision of an inclined brace 18, positioned between the rear axle and the frame bar 10, having an upper forward slightly angular end 19 located within the tubular portion 20 of a bracket 21 securely bolted or otherwise fastened to the under surface of the frame bar 10 forwardly of the forward shackle 16 of the rear spring 14. The angular brace end 19 enters the tubular portion 20 of the bracket through an opening in which this portion of the brace is freely movable and is within the tubular portion 20 of the bracket surmounted by a coil spring 22 which at one end abuts the rear end of the tubular portion 20 of the bracket and is engaged at its opposite end by a nut 23 threaded on the upper forward extremity of the brace and preferably locked thereon.

As shown, the brace 18 is in the form of a rod with its lower rear end provided with a yoke 24 rigidly secured thereto in any suitable manner and embracing and pivotally connected at 25 to the forward reduced end 26 of a clamping plate 27 which may be seated as shown in Fig. 1 below the underslung rear spring 14 and connected to the rear axle 11 through the spring holding clamps 15, the pivot 25 permitting vertical yielding movement between the clamping plate 27 and the brace rod 18 so as to provide for the necessary up and down movement of the parts in relation to one another which movement is facilitated by the particular manner of mounting the upper forward end of the brace rod as previously described.

Instead, however, of using the clamping plate 27 connected to the rear axle 11 through the spring holding clamps, a plate of slightly different shape may be secured directly to the axle 11 or a similar plate may be bolted or otherwise fastened to the brake drum 12, it being understood in any event that the structure shown in Figure 1 is duplicated, that is the brace rod proposed by my invention is mounted at opposite sides of the rear portion of the automobile motor car.

It is obvious from the foregoing that when so used my invention serves to hold the rear axle in its normally alined position and will prevent movement of the same out of such position even in the event of breaking of one of the real springs so as to thus constitute a safety arrangement whose presence will avoid dangers usually incident to the breaking of a rear spring where certain types of rear wheel drives including what is known as the "Hotchkiss" drive are employed.

I claim:—

A safety axle holder for vehicles having axle engaging spring clamps and frame side bars, said holder consisting of an attaching plate securely held by the spring clamps in connection with the axle, a brace rod hingedly connected at its lower rear end to said attaching plate and having an upper angular forward end yieldable vertically with respect to said plate, a bracket attached to the frame side bar and having a downwardly offset tubular portion paralleling the side bar and in which the upper end of the brace rod is disposed, and a spring engaging the last mentioned end of the brace rod and having an abutment within the tubular portion of the bracket.

WILLIAM J. SWETT.